(12) United States Patent
Morohoshi (10) Patent No.: US 9,204,078 B2
(45) Date of Patent: Dec. 1, 2015

(54) DETECTOR, DETECTION METHOD AND VIDEO DISPLAY APPARATUS

(71) Applicant: KABUSHIKI KAISHA TOSHIBA, Minato-ku, Tokyo (JP)

(72) Inventor: Toshihiro Morohoshi, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 13/774,696

(22) Filed: Feb. 22, 2013

(65) Prior Publication Data
US 2014/0002619 A1 Jan. 2, 2014

(30) Foreign Application Priority Data

Jun. 29, 2012 (JP) .................................. 2012-147629

(51) Int. Cl.
| | |
|---|---|
| H04N 13/04 | (2006.01) |
| H04N 5/44 | (2011.01) |
| H04N 21/4223 | (2011.01) |
| H04N 21/431 | (2011.01) |
| H04N 21/44 | (2011.01) |
| H04N 21/81 | (2011.01) |
| G06F 3/01 | (2006.01) |
| G06F 3/03 | (2006.01) |

(52) U.S. Cl.
CPC .............. *H04N 5/4403* (2013.01); *G06F 3/012* (2013.01); *G06F 3/0304* (2013.01); *H04N 13/0445* (2013.01); *H04N 13/0468* (2013.01); *H04N 13/0477* (2013.01); *H04N 21/4223* (2013.01); *H04N 21/4318* (2013.01); *H04N 21/44008* (2013.01); *H04N 21/816* (2013.01); *H04N 13/0409* (2013.01)

(58) Field of Classification Search
None
See application file for complete search history.

(56) References Cited

U.S. PATENT DOCUMENTS

| | | | | |
|---|---|---|---|---|
| 8,526,667 | B2 * | 9/2013 | Tanaka ......................... | 382/100 |
| 8,539,357 | B2 * | 9/2013 | Hildreth ....................... | 715/745 |
| 8,648,876 | B2 * | 2/2014 | Yoshifuji et al. .............. | 345/619 |

(Continued)

FOREIGN PATENT DOCUMENTS

| | | |
|---|---|---|
| CN | 101416235 A | 4/2009 |
| CN | 101488030 A | 7/2009 |

(Continued)

OTHER PUBLICATIONS

Notification of Reason for Rejection mailed by Japan Patent Office on Apr. 16, 2013 in the corresponding Japanese patent application No. 2012-147629.

(Continued)

*Primary Examiner* — Christopher S Kelley
*Assistant Examiner* — Christopher Findley
(74) *Attorney, Agent, or Firm* — Knobbe, Martens, Olson & Bear LLP (57) ABSTRACT

According to one embodiment, a detector configured to detect an operator of a remote control for remote-controlling a video display apparatus is provided. The detector includes a face detector, a remote control detector, and an operator identifier. The face detector is configured to detect a first position of a viewer's face from a taken video. The remote control detector is configured to detect a second position of the remote control from the taken video. The operator identifier is configured to identify a viewer operating the remote control based on the detected first position of the viewer's face and the detected second position of the remote control when a plurality of viewer's faces are detected.

14 Claims, 8 Drawing Sheets

(56) References Cited

U.S. PATENT DOCUMENTS

| | | |
|---|---|---|
| 8,654,182 B2 * | 2/2014 | Ishikawa et al. ............... 348/51 |
| 8,675,880 B2 | 3/2014 | De Bruijn et al. |
| 2009/0133051 A1 | 5/2009 | Hildreth |
| 2009/0138805 A1 | 5/2009 | Hildreth |
| 2011/0316881 A1 | 12/2011 | Yoshifuji et al. |
| 2013/0194394 A1 * | 8/2013 | Shintani ........................ 348/51 |

FOREIGN PATENT DOCUMENTS

| | | |
|---|---|---|
| CN | 101925915 A | 12/2010 |
| CN | 102300110 A | 12/2011 |
| JP | 2003-223422 | 8/2003 |
| JP | 2007-096890 | 4/2007 |
| JP | 2010-045604 A | 2/2010 |
| JP | 2011-504710 | 2/2011 |
| JP | 2011-505618 A | 2/2011 |
| JP | 2011-223573 A | 11/2011 |
| JP | 2011-239279 A | 11/2011 |
| JP | 2012-010085 A | 1/2012 |
| WO | WO 2009-067670 A1 | 5/2009 |
| WO | WO 2009/067676 A1 | 5/2009 |

OTHER PUBLICATIONS

Notification of the First Office Action mailed by the State Intellectual Property Office of the People's Republic of China on Dec. 2, 2014 in the corresponding Chinese patent application No. 2013100844212—22 pages.

Notification of the Second Office Action issued by the State Intellectual Property Office of the People's Republic of China on Aug. 5, 2015 in the corresponding Chinese patent application No. 2013100844212—12 pages.

* cited by examiner

DETECTOR, DETECTION METHOD AND VIDEO DISPLAY APPARATUS

CROSS REFERENCE TO RELATED APPLICATIONS

This application is based upon and claims the benefit of priority from the prior Japanese Patent Application No. 2012-147629, filed on Jun. 29, 2012, the entire contents of which are incorporated herein by reference.

FIELD

Embodiments described herein relate generally to a detector, a detection method and a video display apparatus.

BACKGROUND

In recent years, stereoscopic video display devices (so-called autostereoscopic TVs), through which a viewer can see video auto-stereoscopically without using special glasses, are becoming widely used. This kind of stereoscopic video display device displays a plurality of images whose viewpoints are different from each other. Output directions of light beams from the images are controlled by, for example, a parallax barrier, a lenticular lens, or the like, so that the light beams are guided to the eyes of the viewer. If the position of the viewer is appropriate, the viewer views different parallax images with the left eye and the right eye, and thus, the viewer can recognize video stereoscopically.

However, there is a problem that video displayed on the autostereoscopic TV is not viewed stereoscopically depending on the position of the viewer. Therefore, it is preferable that the autostereoscopic TV performs adjustment so that the viewer can see the video stereoscopically.

By the way, a plurality of viewers may view the video display apparatus. In this case, among the plurality of viewers, the viewer remote-controlling the video display apparatus often have the highest viewing motivation. Therefore, it is preferable to perform the adjustment so that the viewer who operates the remote control can see the video stereoscopically.

DETAILED DESCRIPTION

In general, according to one embodiment, a detector configured to detect an operator of a remote control for remote-controlling a video display apparatus is provided. The detector includes a face detector, a remote control detector, and an operator identifier. The face detector is configured to detect a first position of a viewer's face from a taken video. The remote control detector is configured to detect a second position of the remote control from the taken video. The operator identifier is configured to identify a viewer operating the remote control based on the detected first position of the viewer's face and the detected second position of the remote control when a plurality of viewer's faces are detected.

Embodiments will now be explained with reference to the accompanying drawings.

First Embodiment

Figure 1:
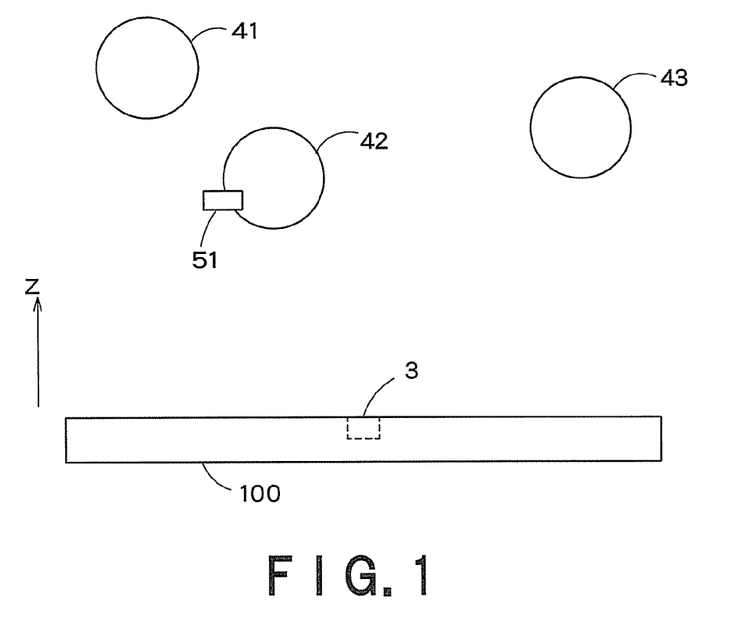
FIG. 1 is a top view in which a plurality of viewers 41 to 43 view a video display apparatus 100.
Figure 2:
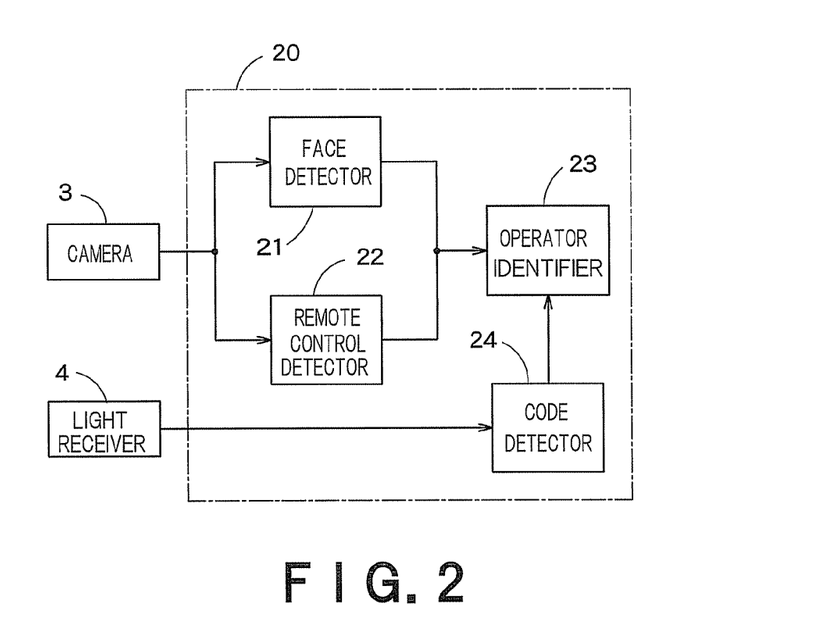
FIG. 2 is a block diagram showing a schematic configuration of a remote-control-operator detection system for detecting the operator of the remote control 51.

FIG. 1 is a top view in which a plurality of viewers 41 to 43 view a video display apparatus 100. In FIG. 1, the viewer 42 holds and operates a remote control 51. The remote control 51 emits an infrared signal for remote-controlling the video display apparatus 100. FIG. 2 is a block diagram showing a schematic configuration of a remote-control-operator detection system for detecting the operator of the remote control 51.

The remote-control-operator detection system includes a camera 3 and a remote-control-operator detector (hereinafter, referred to as "detector" simply) 20. The detector 20 has a face detector 21, a remote control detector 22, and an operator identifier 23. The remote-control-operator detection system can further includes a light receiver 4, and the detector 20 can further has a code detector 24.

The camera 3 of FIG. 2 is, for example, a CMOS (Complementary Metal Oxide Semiconductor) camera or a CCD (Charge Coupled Device) camera. The camera 3 is attached or mounted at a center and lower part of a bezel of the video display apparatus 100. Then, the camera 3 and the display panel of the video display apparatus 100 look toward the same direction, and the camera 3 takes a video in front of the video display apparatus 100. For example, when the camera 3 takes the video under the situation of FIG. 1, the video as shown in FIG. 3 is obtained.

Figure 3:
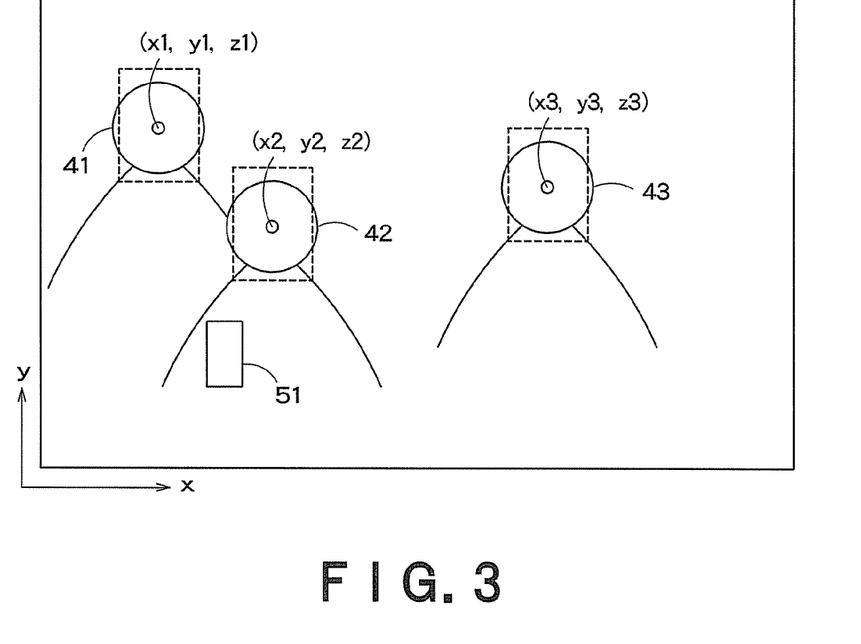
FIG. 3 is a diagram showing an example of a video taken by the camera 3.

Note that the dashed line and the coordinates in FIG. 3 are used for the explanation below, and are not displayed on the actual video. Furthermore, for convenience, the left lower point of the video is defined as an origin, the horizontal direction is defined as "x" axis (positive for right side), and the vertical direction is defined as "y" axis (positive for upper side). Additionally, the distance from the video display apparatus 100 is defined as "z", as shown in FIG. 1.

Figure 4:
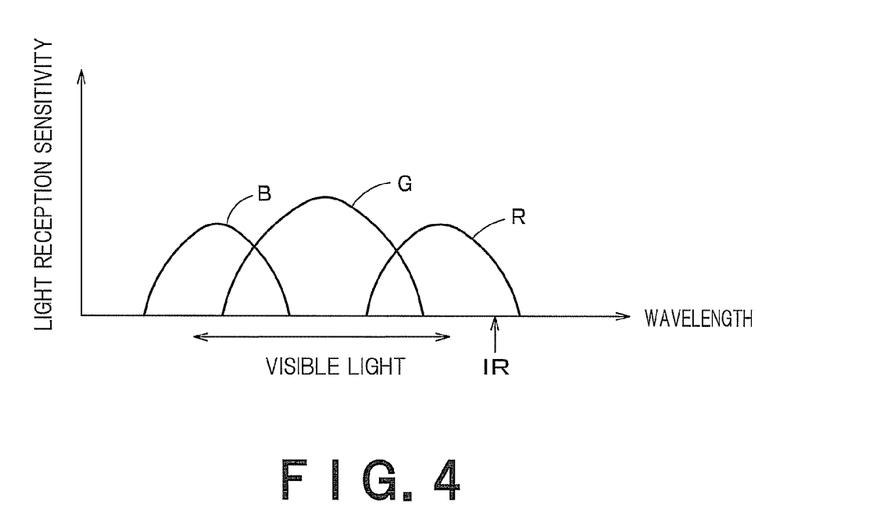
FIG. 4 is a diagram schematically showing light reception sensitivity of pickup elements the camera 3 has.

Here, the camera 3 can detect not only visible light but also infrared light. FIG. 4 is a diagram schematically showing light reception sensitivity of pickup elements the camera 3 has. The camera 3 has "R" pickup elements, "G" pickup elements, and "B" pickup elements. The "R" pickup elements have high sensitivity to long wavelength among the visible light, and also have the sensitivity to infrared (IR) region. Therefore, the "R" pickup elements can take the infrared signal emitted by the remote control 51, and thus, the infrared signal appears in the taken video.

Note that the "G" pickup elements have high sensitivity to middle wavelength among the visible light, and the "B"

pickup elements have high sensitivity to short wavelength among the visible light. Therefore, the "G" and "B" pickup elements hardly respond to the infrared signal.

The video taken by the camera 3 is provided to the face detector 21 and the remote control detector 22 in the detector 20.

The face detector 21 detects faces from the video taken by the camera 3, and identifies the position of the faces. The face detector 21 stores in advance features of the face such as eyes, noses, mouths and so on, and detects parts in the video coinciding with these features as the face. Then, the face detector 21 identifies the position of the face, more specifically, identifies the positions on the "x" axis and "y" axis of the center of the face and identifies the distance "z" from the video display apparatus 100. The distance "z" from the video display apparatus 100 can be estimated from the width of the face or from the distance between the right eye and the left eye, for example. In FIG. 3, the positions of the faces of the detected viewers 41 to 43 are assumed to be (x1, y1, z1), (x2, y2, z2) and (x3, y3, z3), respectively. These positions of faces are provided to the operator identifier 23.

Figure 5A:
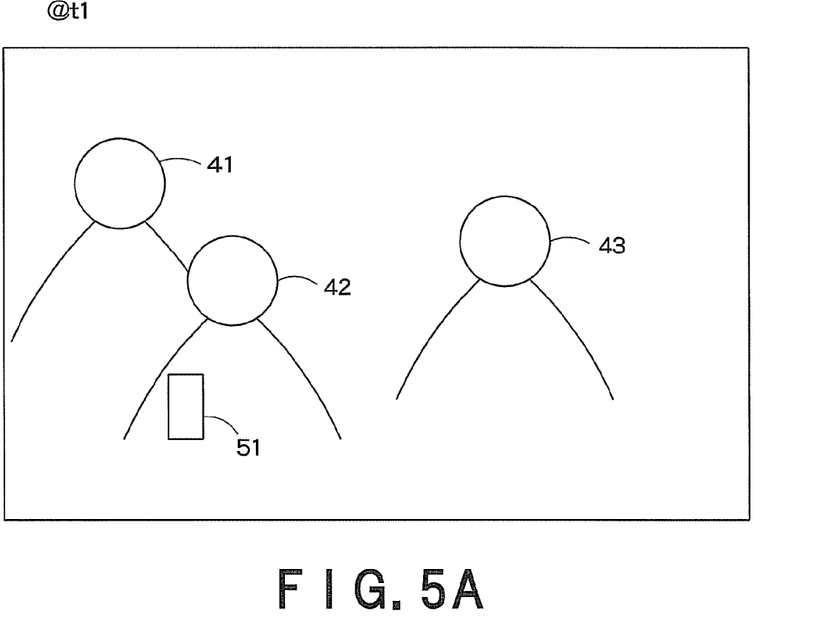
FIGS. 5A, 5B are diagrams for explaining the operation of the remote control detector 22.
Figure 5B:
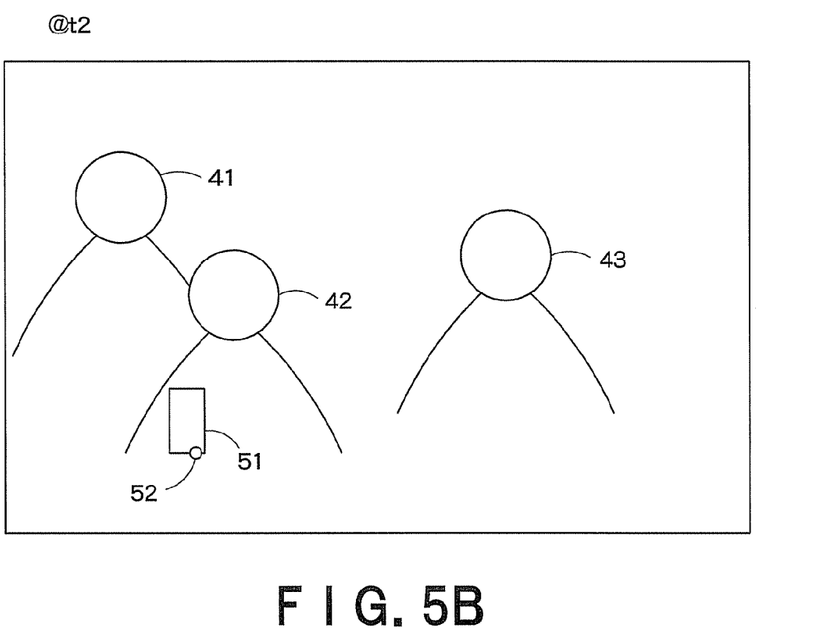
Figure 6:
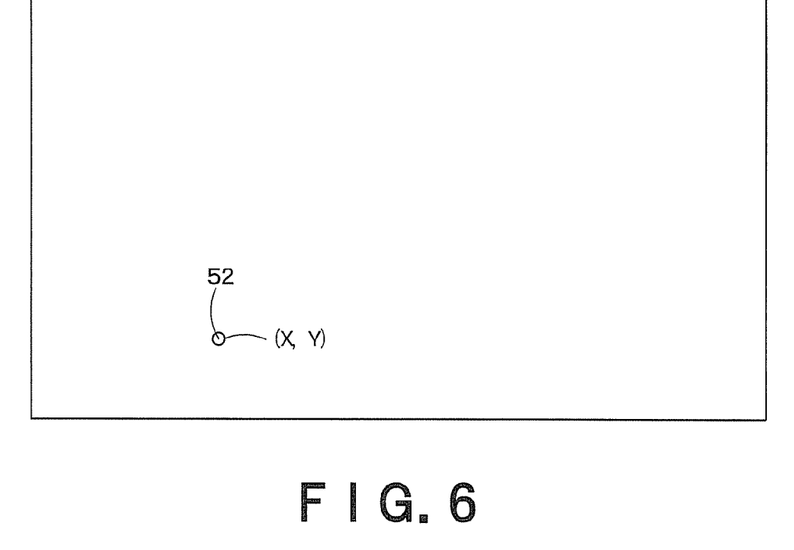
FIG. 6 is a diagram for explaining the operation of the remote control detector 22.

On the other hand, the remote control detector 22 detects the remote control 51 from the video taken by the camera 3 to identify the position of the remote control 51. FIGS. 5A, 5B and FIG. 6 are diagrams for explaining the operation of the remote control detector 22. FIGS. 5A and 5B show videos taken at time t1 and t2, respectively. At time t1, the remote control 51 is not operated, and thus, the remote control 51 does not emit any infrared signal. At time t2 which is after time t2, the viewer 42 operates the remote control 51, and thus, the remote control 51 emits the infrared signal 52. As stated above, the camera 3 also takes the infrared signal 52.

Then, the remote control detector 22 calculates differences between the video at t1 and the video at t2 by each pixel. FIG. 6 schematically shows a result of difference operation. If time t2 is close to time t1, there are few differences between the video at t1 and the video at t2 except that the remote control 51 emits the infrared signal 52. That is, the difference value(s) at the pixel(s) corresponding to the infrared signal 52 becomes high, and the difference values at the other pixels become nearly 0.

In this way, the position of the infrared signal can be detected by the difference operation. Hereinafter, the detected positions of the infrared signal on the "x" axis and the "y" axis are defined as (X, Y). The position (X, Y) of the remote control 51 is provided to the operator identifier 23. Note that it is unnecessary to obtain the distance between the remote control 51 and the video display apparatus 100.

Note that there may be noise in the video. In this case, the difference value of pixels other than pixels corresponding to the infrared signal may become high, even if the difference operation between the videos, whose taking times are different from each other, is performed. Therefore, the remote control detector 22 may determine that there is an infrared signal of the remote control 51 only when the pixels, whose difference values are higher than a predetermined value, are neighboring and the number of the neighboring pixels is equal to or smaller than a predetermined size. This is because the infrared signal is not so large.

If the infrared signal is emitted at a position the distance from which to the video display apparatus 100 is 1 m and then the number of pixels whose difference values are higher than the predetermined values is "N", the above predetermined size can be determined to be "N", for example. As a specific example, the predetermined size can be 4 (horizontal pixel)×4 (vertical pixel).

Furthermore, although the remote control detector 22 can use the pixel values taken by the "R", "G" and "B" pickup elements, the remote control detector 22 can use only the pixel values taken by the "R" pickup elements. As shown in FIG. 4, the "R" pickup elements has the highest sensitivity to the infrared signal comparing to the "G" and "B" pickup elements, and thus, it is possible to detect the remote control by considering only the "R" pickup elements, which can reduce the load of the difference operation. Moreover, the affect of the noise can be reduced by not using the pixel values taken by the "G" and "B" pickup elements.

Referring back to FIG. 2, the operator identifier 23 of the detector 20 identifies which viewer is operating the remote control 51 based on the position of the face provided from the face detector 21 and the position of the remote control 51 provided from the remote control detector 22. More specifically, the operator identifier 23 identifies, among the viewers 41 to 43, the viewer satisfying the following two assumptions as the remote-control-operator.

$$|X-x| \text{ is the minimum.} \quad (1)$$

$$y > Y \quad (2)$$

The assumption (1) is obtained by the fact that the position of the face of the remote-control-operator on the "x" axis is closer to the remote control 51 on the x-axis, comparing to the other viewers. The assumption (2) is obtained by the fact that the position of the face of the remote-control-operator is higher than the position of the remote control 51 since the remote control is operated using hands.

In FIG. 3, |X−x2| is smaller than |X−x1| and |X−x3|. In FIG. 6, y2>Y is satisfied. Therefore, the operator identifier can identify that the viewer 42 is the remote-control-operator. Note that, the operator identifier 23 does not identify the remote-control-operator when only one face is detected, the remote control 51 is not detected, or no viewers satisfy the above two assumptions.

Furthermore, in order to identify the remote-control-operator more exactly, the assumption (2) can be replaced by the following assumption (2').

$$y > Y + f(z). \quad (2)$$

Here, f(z) is a value depending on "z", more specifically, f(z) becomes smaller as "z" is larger. This is because the distance between the face and the remote control in the video becomes smaller as the viewer is farther from the video display apparatus 100 (as "z" is larger).

In this manner, the detector 20 can identify the remote-control-operator.

By the way, the remote control detector 22 of FIG. 2 may detect not only the remote control for the video display apparatus 100 but also remote controls for other apparatus such as air-conditioner and so on. As a result, the operator identifier 23 may identify the viewer operating the remote control for other apparatus as the viewer operating the remote control for the video display apparatus 100 erroneously.

Therefore, the code detector 24 can be provided. The code detector 24, based on the infrared signal from the remote control received by the light receiver 4, determines whether or not the infrared signal is a signal to the video display apparatus 100. The code detector 24 can determines whether or not the infrared signal is a signal to the video display apparatus 100 by analyzing the code of the infrared signal. If the infrared signal is not the signal to the video display apparatus 100, the code detector 24 tell the code detector 24 that the infrared signal is not the signal to the video display apparatus 100.

In this case, the operator identifier 23 does not identify the remote-control-operator even if there is a viewer satisfying the above assumptions.

As stated above, in the first embodiment, the face of the viewer and the remote control are detected by using the video taken by the camera 3, and based on the positional relationship thereof, the remote-control-operator can be identified.

Second Embodiment

A second embodiment relates to a stereoscopic video display apparatus using the remote-control-operator detection system according to the first embodiment, more specifically, a viewing area is set at the remote-control-operator.

Figure 7:
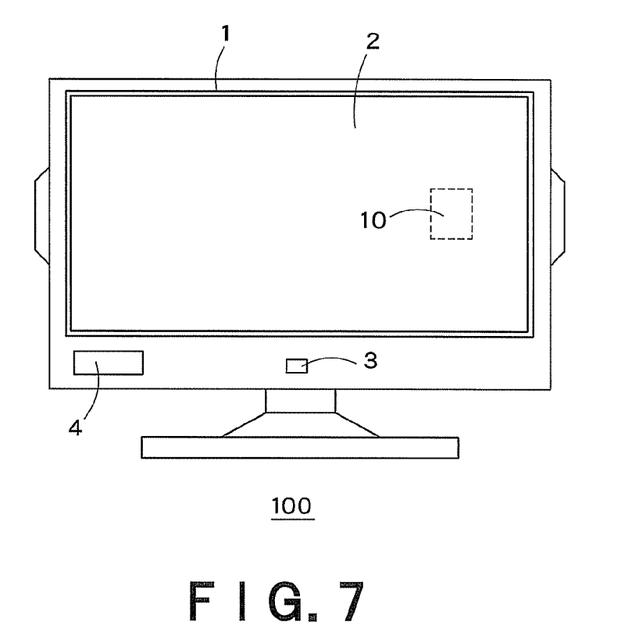
FIG. 7 is an external view of a video display apparatus 100 according to an embodiment.
Figure 8:
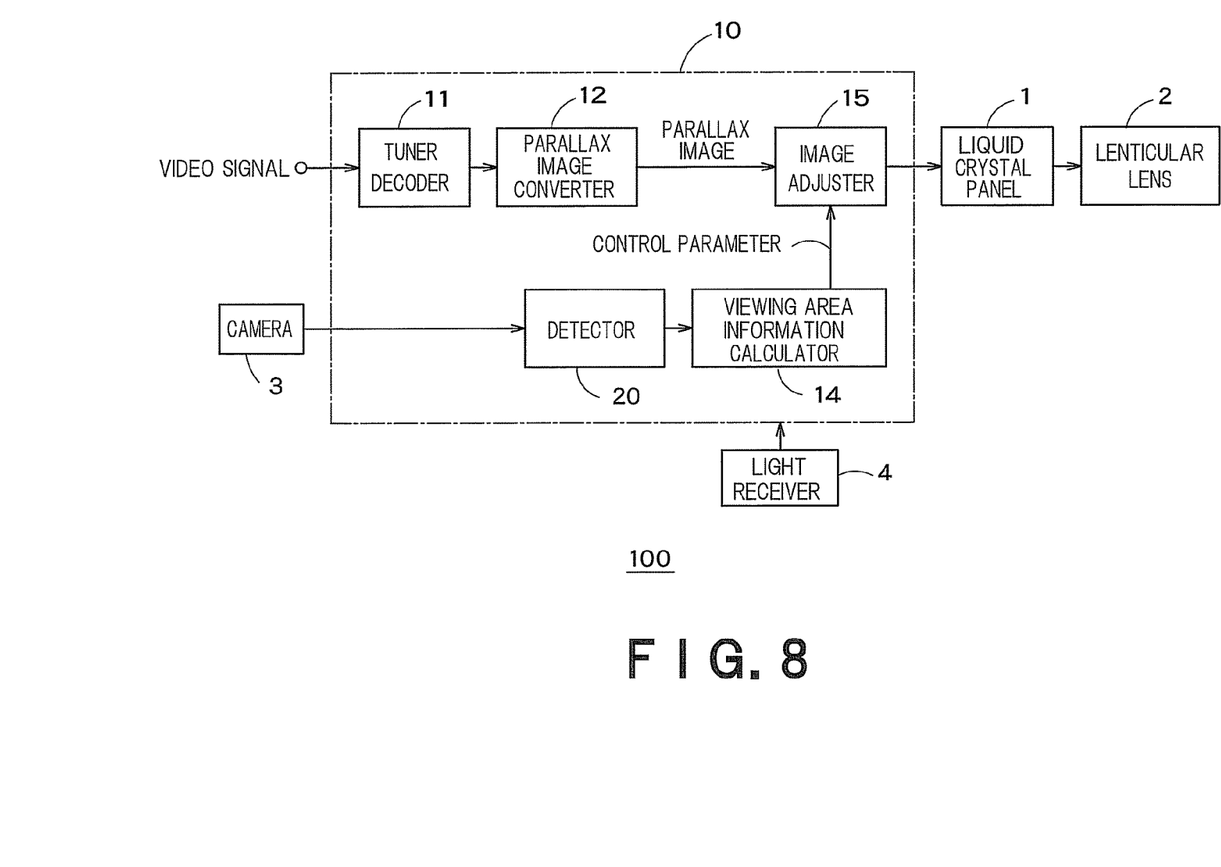
FIG. 8 is a block diagram showing a schematic configuration of the video display apparatus 100.

FIG. 7 is an external view of a video display apparatus 100 according to an embodiment. FIG. 8 is a block diagram showing a schematic configuration of the video display apparatus 100. The video display apparatus 100 includes a liquid crystal panel 1, a lenticular lens 2, a camera 3, a light receiver 4, and a controller 10.

The liquid crystal panel 1 is, for example, a 55-inch size panel and has 11520 (=1280*9) pixels in a horizontal direction and 720 pixels in a vertical direction. In each pixel, three sub-pixels, that is, an R sub-pixel, a G sub-pixel, and a B sub-pixel, are formed in the vertical direction. The liquid crystal panel 1 is irradiated with light from a backlight device (not shown in FIG. 7) provided on a rear surface. Each pixel transmits light with intensity according to a parallax image signal (described later) supplied from the controller 10.

The lenticular lens (aperture controller) 2 has a plurality of convex portions arranged along the horizontal direction of the liquid crystal panel 1. The number of the convex portions is ⅑ of the number of pixels in the horizontal direction of the liquid crystal panel 1. The lenticular lens 2 is attached to a surface of the liquid crystal panel 1 so that one convex portion corresponds to 9 pixels arranged in the horizontal direction. Light passing through each pixel is outputted with directivity from near the apex of the convex portion in a specific direction.

The liquid crystal panel 1 can display stereoscopic video under the multi-parallax manner using three or more parallaxes (integral-imaging manner) or two parallax manner. Furthermore, the liquid crystal panel 1 can also display two-dimensional video.

In the description below, an example will be described in which 9 pixels are provided for each convex portion of the lenticular lens 2 and a multi-parallax manner of 9 parallaxes can be employed. In the multi-parallax manner, a first to a ninth parallax images are respectively displayed on the 9 pixels corresponding to each convex portion. The first to the ninth parallax images are images respectively obtained by viewing a subject from nine viewpoints aligned along the horizontal direction of the liquid crystal panel 1. The viewer can view video stereoscopically by viewing one parallax image among the first to the ninth parallax images with the left eye and viewing another parallax image with the right eye through the lenticular lens 2. According to the multi-parallax manner, the greater the number of parallaxes is, the lager the viewing area is. The viewing area is an area where a viewer can view video stereoscopically when the viewer views the liquid crystal panel 1 from the front of the liquid crystal panel 1.

On the other hand, in the two parallax manner, parallax images for a right eye are displayed in four pixels and parallax images for a left eye are displayed in the other five pixels among the nine pixels corresponding to each convex portion. The parallax images for a left eye and a right eye are images obtained by viewing the object from a left-side viewpoint and a right-side viewpoint respectively among the two viewpoints arrayed in the horizontal direction. The viewer can view the parallax image for a left eye with the left eye and the parallax image for a right eye with the right eye via the lenticular lens 2, so as to stereoscopically view the video. According to the two parallax manner, a stereoscopic appearance of displayed video is easier to obtain than in the multi-parallax system, but a viewing area is narrower than that in the multi-parallax system.

The liquid crystal panel 1 can display a two-dimensional image by displaying the same color by 9 pixels corresponding to each convex portion.

In the present embodiment, the viewing area can be variably controlled according to a relative positional relationship between a convex portion of the lenticular lens 2 and the parallax images to be displayed, that is, how the parallax images are displayed on the 9 pixels corresponding to each convex portion. Hereinafter, the control of the viewing area will be described.

Figure 9A:
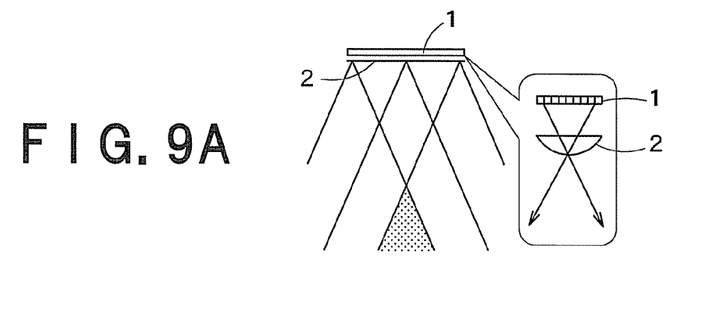
FIGS. 9A to 9C are diagrams of a part of the liquid crystal panel 1 and the lenticular lens 2 as seen from above.
Figure 9B:
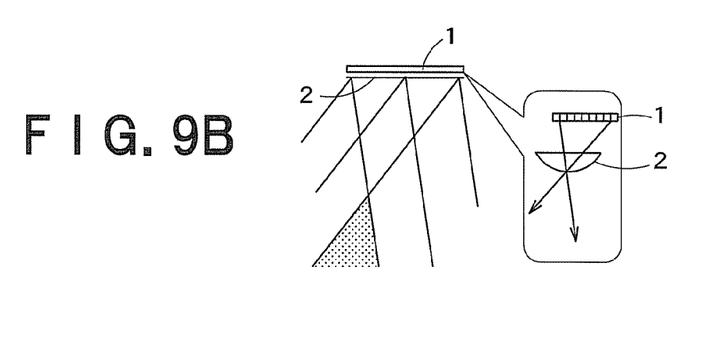
Figure 9C:
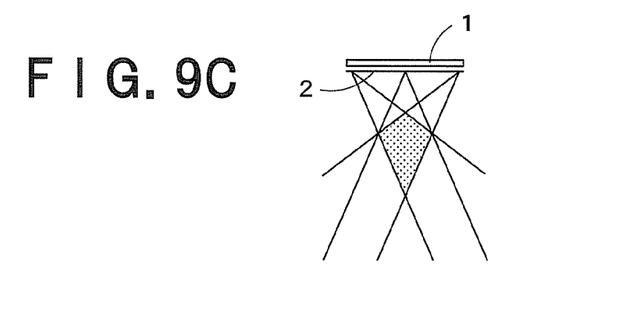

FIGS. 9A to 9C are diagrams of a part of the liquid crystal panel 1 and the lenticular lens 2 as seen from above. The shaded areas in the drawings indicate the viewing areas. When the liquid crystal panel 1 is viewed from the viewing area, video can be viewed stereoscopically. In other areas, reverse view and/or crosstalk occur and video is difficult to be viewed stereoscopically.

FIGS. 9A to 9C show relative positional relationships between the liquid crystal panel 1 and the lenticular lens 2, more specifically, a situation in which the viewing area varies depending on a distance between the liquid crystal panel 1 and the lenticular lens 2, or depending on the amount of shift between the liquid crystal panel 1 and the lenticular lens 2 in the horizontal direction.

In practice, the lenticular lens 2 is attached to the liquid crystal panel 1 by accurately positioning the lenticular lens 2 to the liquid crystal panel 1, and thus, it is difficult to physically change the relative positions of the liquid crystal panel 1 and the lenticular lens 2.

Therefore, in the present embodiment, display positions of the first to the ninth parallax images displayed on the pixels of the liquid crystal panel 1 are shifted, so that the relative positional relationship between the liquid crystal panel 1 and the lenticular lens 2 is changed apparently. Thereby, the viewing area is adjusted.

For example, comparing to a case in which the first to the ninth parallax images are respectively displayed on the 9 pixels corresponding to each convex portion (FIG. 9A), the viewing area moves left when the parallax images are collectively shifted right (FIG. 9B). On the other hand, when the parallax images are collectively shifted left, the viewing area moves right.

When the parallax images are not shifted near the center in the horizontal direction, and the nearer to the outer edge of the liquid crystal panel 1 the parallax images are located, the larger the parallax images are shifted outward (FIG. 9C), the viewing area moves toward the liquid crystal panel 1. A pixel between a parallax image that is shifted and a parallax image that is not shifted, and/or a pixel between parallax images that are shifted by different amounts, may be generated by interpolation according to surrounding pixels. Contrary to FIG. 9C, when the parallax images are not shifted near the center in the horizontal direction, and the nearer to the outer edge of the liquid crystal panel 1 the parallax images are located, the larger the parallax images are shifted toward the center, the viewing area moves outward from the liquid crystal panel 1.

In this way, by shifting and displaying all the parallax images or a part of the parallax images, the viewing area can be moved in the left-right direction or the front-back direction with respect to the liquid crystal panel 1. Although only one viewing area is shown in FIG. 9 for the simplicity of the description, actually, there are a plurality of viewing areas in an audience area P and the viewing areas move in conjunction with each other as shown in FIG. 9. The viewing areas are controlled by the controller 10 shown in FIG. 8 described later.

Referring back to FIG. 8, the camera 3 is attached near the lower center position of the liquid crystal panel 1 at a predetermined elevation angle. The camera 3 takes video in a predetermined range in front of the liquid crystal panel 1. The taken video is supplied to the detector of the controller 10.

The light receiver 4 is provided at, for example, the lower left portion of the liquid crystal panel 1. The light receiver 4 receives an infrared signal transmitted from a remote control used by the viewer. The infrared signal includes a signal indicating whether to display stereoscopic video or to display two-dimensional video, whether to employ a multi-parallax manner or a two-parallax manner when displaying stereoscopic video, whether to control the viewing areas or not, and the like.

Next, the details of constituent elements of the controller 10 will be described. As shown in FIG. 8, the controller 10 includes a tuner decoder 11, a parallax image converter 12, a detector 20, a viewing area information calculator 14, and an image adjuster 15. The controller 10 is mounted as, for example, one IC (Integrated Circuit) and disposed on the rear surface of the liquid crystal panel 1. Of course, a part of the controller 10 may be implemented as software.

The tuner decoder (receiver) 11 receives and selects an inputted broadcast wave and decodes a coded input video signal. When a data broadcast signal such as electronic program guide (EPG) is superimposed on the broadcast wave, the tuner decoder 11 extracts the data broadcast signal. Or, the tuner decoder 11 receives a coded input video signal from a video output device such as an optical disk reproducing device and a personal computer instead of the broadcast wave and decodes the coded input video signal. The decoded signal is also called a baseband video signal and supplied to the parallax image converter 12. When the video display apparatus 100 receives no broadcast wave and exclusively displays the input video signal received from the video output device, a decoder having only a decoding function may be provided instead of the tuner decoder 11 as a receiver.

The input video signal received by the tuner decoder 11 may be a two-dimensional video signal or a three-dimensional video signal including images for the left eye and the right by a frame-packing (FP) manner, a side-by-side (SBS) manner, a top-and-bottom (TAB) manner, or the like. The video signal may be a three-dimensional video signal including an image of three or more parallaxes.

The parallax image converter 12 converts the baseband video signal into a plurality of parallax image signals in order to display video stereoscopically. The process of the parallax image converter 12 depends on whether the baseband signal is a two-dimensional video signal or a three-dimensional video signal.

In the case of adopting the two parallax manner, the parallax image converter 12 generates parallax image signals for a left eye and a right eye corresponding to parallax images for a left eye and a right eye, respectively. More specifically, the following will be performed.

When the two parallax manner is adopted and a stereoscopic video signal including images for a left eye and a right eye is input, the parallax image converter 12 generates parallax image signals for a left eye and a right eye in a format which can be displayed on the liquid crystal panel 1. Further, when a three-dimensional video signal including equal to or more than three images is input, the parallax image converter 12, for example, uses arbitrary two images among them to generate parallax image signals for a left eye and a right eye.

As opposed to this, in a case where the two parallax manner is adopted and a two dimensional video signal including no parallax information is input, the parallax image converter 12 generates parallax images for a left eye and a right eye based on a depth value of each pixel in the video signal. The depth value is a value indicating that to what extent each pixel is displayed so as to be viewed in front of or in the back of the liquid crystal panel 1. The depth value may be previously added to a video signal, or may be generated by performing motion detection, identification of a composition, detection of a human's face, or the like. In the parallax image for a left eye, a pixel viewed in front needs to be shifted to the right side of a pixel viewed in the back, and to be displayed. For this reason, the parallax image converter 12 performs processing of shifting the pixel viewed in front to the right side in the video signal, to generate a parallax image signal for a left eye. The larger the depth value is, the larger the shift amount is.

Meanwhile, in the case of adopting the multi parallax manner, the parallax image converter 12 generates first to nine parallax image signals corresponding to first to nine parallax images, respectively. More specifically, the following will be performed.

When the multi-parallax system is adopted and a two-dimensional video signal or a stereoscopic video signal including less than nine parallaxes is input, the parallax image converter 12 generates first to nine parallax image signals based on depth information similar to generating parallax image signals for a left eye and a right eye from a two-dimensional video signal.

When the multi parallax manner is adopted and a stereoscopic video signal including nine parallaxes is input, the parallax image converter 12 generates first to nine parallax image signals using the video signal.

The detector 20 is a detector 20 explained in the first embodiment. The detector 20 detects a remote-control-operator among the viewers by using video taken by the camera 3, and provides the position information to the viewing area information calculator 14.

The viewing area information calculator 14 calculates a control parameter (for example, shift amount explained in FIGS. 9A to 9C) for setting a viewing area appropriately according to the position information of the detected viewer, and then, the viewing area information calculator 14 provides the calculated control parameter to the image adjuster 15.

Figure 10A:
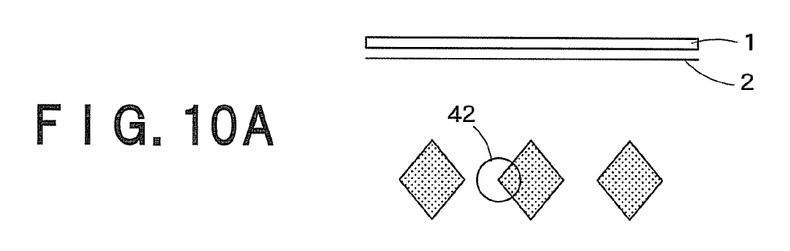
FIGS. 10A to 10E are diagrams showing an example of the technique for calculating viewing area information.
Figure 10B:
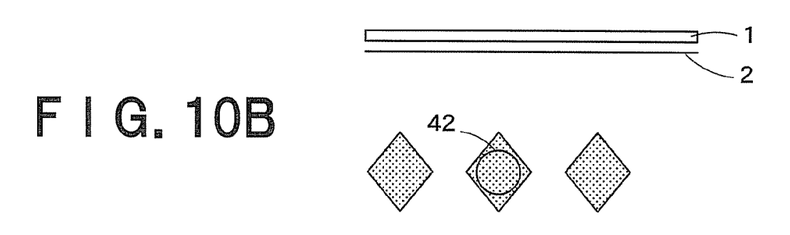
Figure 10C:
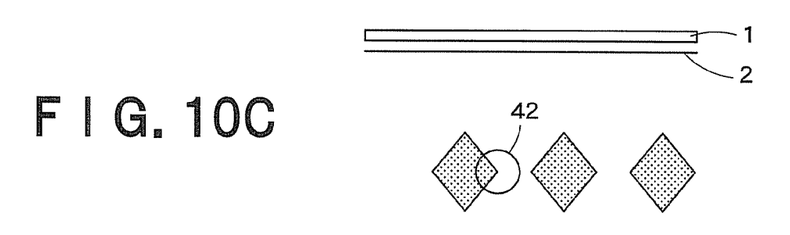
Figure 10D:
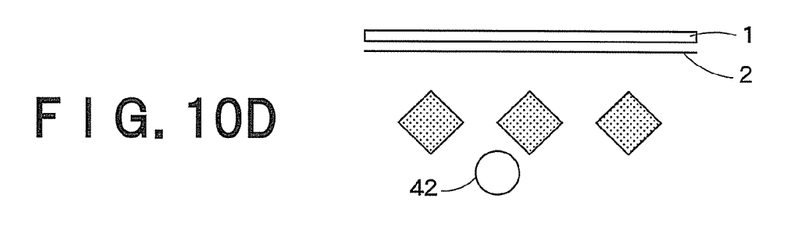
Figure 10E:
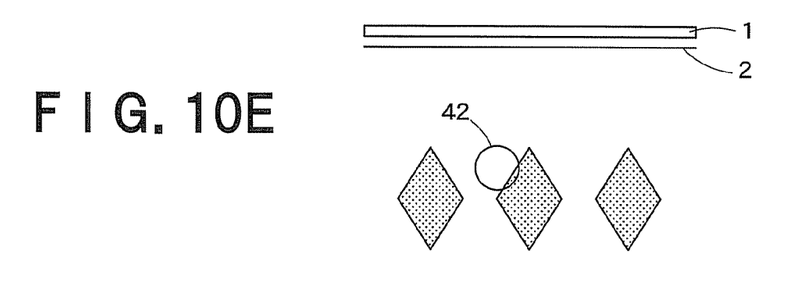

FIGS. 10A to 10E are diagrams showing an example of the technique for calculating viewing area information. The viewing area information calculator 14 previously defines several settable patterns of viewing area. Then, the viewing area information calculator 14 calculates an overlapping area between the viewing area and the detected viewer, and determines a viewing area with the calculated area being maximal as an appropriate viewing area. In the example of FIG. 10, an overlapping area between the viewer 42 operating the remote control 51 and the viewing area is maximal in FIG. 10B where the viewing area is set on the left side with respect to the liquid crystal panel 1 among five patterns of viewing area (shaded areas) in FIGS. 10A to 10E which have been previously defined. Therefore, the viewing area information calculator 14 determines the pattern of viewing area in FIG. 10B as an appropriate viewing area. In this case, a control parameter for displaying the parallax image in the pattern in FIG. 10B is provided to the image adjuster 15 in FIG. 8.

More specifically, in order to set a desired viewing area, the viewing area information calculator 14 may use a viewing area database associating the control parameter with a viewing area set by that control parameter. The viewing area information calculator 14 can find a viewing area capable of keeping the selected viewers by searching the viewing area database.

The image adjuster (viewing area controller) 15 performs adjustment such as shifting and interpolating the parallax image signals according to the calculated control parameter in order to control the viewing area, and thereafter supplies the parallax image signals to the liquid crystal panel 1 to cause the liquid crystal panel 1 to display the parallax images.

Note that, the controller 10 can always detect the remote-control-operator and set the viewing area in real-time every time the remote control 51 is detected. However, if the viewing area often moves every time the remote control 51 is operated, it may become difficult to view the video. Therefore, the viewer can control the timing to set the viewing area by using the remote control 51.

For example, a viewing area adjustment instruction signal is generated and emitted when a predetermined button of the remote control 51 is pushed, and the light receiver 4 receives the viewing area adjustment instruction signal. In synchronization with the reception of the viewing area adjustment instruction signal, the viewing information calculator 14 updates the control parameter. In other word, even if the detector 20 detects the remote-control-operator, the viewing area is not re-set until the viewing area adjustment instruction is generated.

Figure 11:
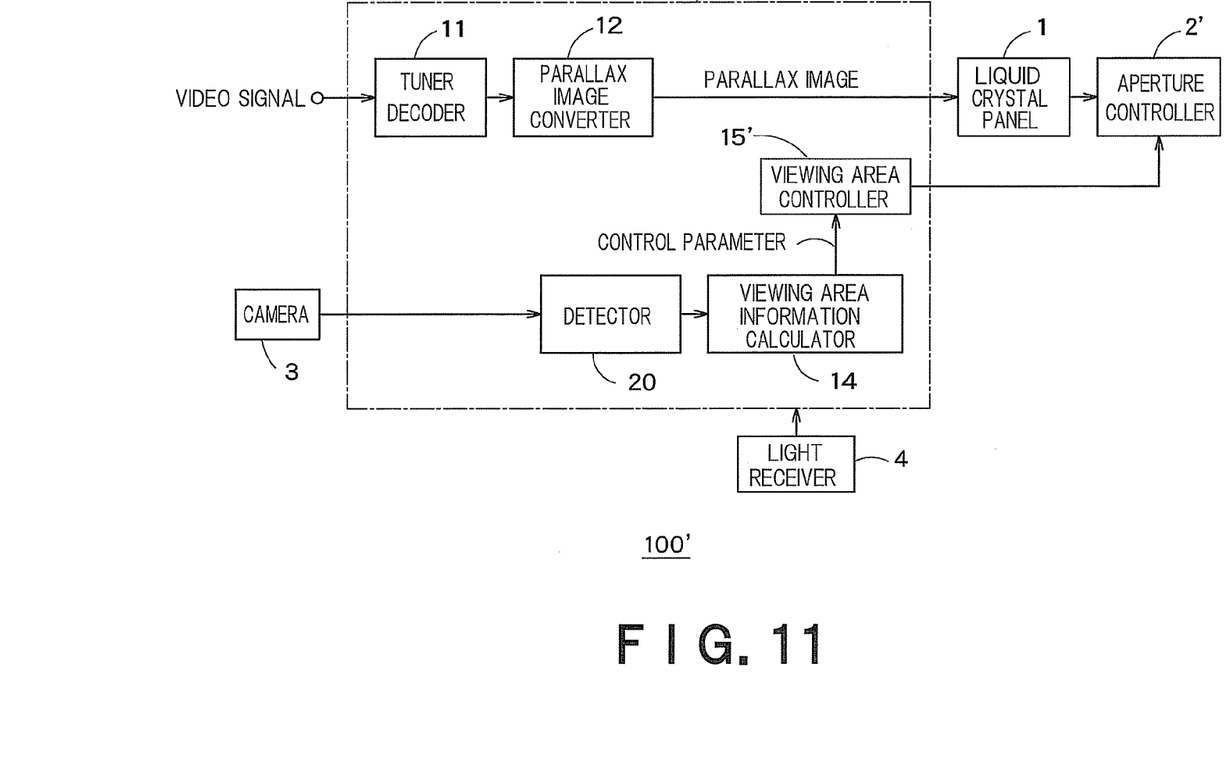
FIG. 11 is a block diagram showing a schematic configuration of the video display apparatus 100'.

Although, in each embodiment, an example is described in which the lenticular lens 2 is used and the viewing area is controlled by shifting the parallax images, the viewing area may be controlled by other manners. For example, instead of the lenticular lens 2, a parallax barrier may be provided as an aperture controller 2'. FIG. 11 is a block diagram showing a schematic configuration of the video display apparatus 100' which is a modified example of the embodiments shown in FIG. 8. As shown in FIG. 11, the controller 10' of the video display apparatus 100' has the viewing area controller 15 instead of the image adjuster 15. In this case, the distance between the liquid crystal panel 1 and the apertural area controller 2', a horizontal shift length between the liquid crystal panel 1 and the apertural controller 2', or the like is regarded as a control parameter, and an output direction of a parallax image displayed on the liquid crystal panel 1 is controlled, thereby controlling the viewing area.

At least a part of the remote control detection system explained in the above embodiments can be formed of hardware or software. When the remote control detection system is partially formed of the software, it is possible to store a program implementing at least a partial function of the remote control detection system in a recording medium such as a flexible disc, CD-ROM, etc. and to execute the program by making a computer read the program. The recording medium is not limited to a removable medium such as a magnetic disk, optical disk, etc., and can be a fixed-type recording medium such as a hard disk device, memory, etc.

Further, a program realizing at least a partial function of the remote control detection system can be distributed through a communication line (including radio communication) such as the Internet etc. Furthermore, the program which is encrypted, modulated, or compressed can be distributed through a wired line or a radio link such as the Internet etc. or through the recording medium storing the program.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and spirit of the inventions.

The invention claimed is:

1. A detector configured to detect an operator of a remote control for remote-controlling a video display apparatus, the detector comprising:
   a face detector configured to detect a first position of a viewer's face from a video;
   a remote control detector configured to detect a second position of the remote control from the video; and
   an operator identifier configured to identify a viewer operating the remote control based on the detected first position of the viewer's face and the detected second position of the remote control when a plurality of viewer's faces are detected, wherein
   when the plurality of viewer's faces are detected, the operator identifier is configured to identify a first viewer as the viewer operating the remote control,
   a distance between a first horizontal direction position of the first viewer's face and a second horizontal direction position of the remote control being minimum, and
   a following equation (1) being satisfied, $$y > Y + f(z) \tag{1}$$

here, y is a first vertical direction position of the first viewer's face in the video, Y is a second vertical direction position of the remote control in the video, f(z) is a value which becomes smaller as a distance z is larger, the distance z is a distance between the video display apparatus and the detected face.

2. The detector of claim 1, wherein the remote control detector is configured to detect the second position of the remote control based on a difference between the video taken at time t1 and the video taken at time t2 which is after the time t1.

3. The detector of claim 1, wherein the remote control detector is configured to detect a third position as the second position of the remote control,
   difference value between each first pixel of the video at the third position taken at time t1 and each second pixel of the video at the third position taken at time t2 which is after the time t1 being larger than a first value, and
   the number of pixels at the third position being equal to or less than a first size.

4. The detector of claim 1, wherein the remote control is configured to generate an infrared signal,
   the remote control detector is configured to detect the second position of the remote control from the video taken by a camera,
   the camera comprises:
   a first pickup element whose sensitivity is high for light with long wavelength among visible light;
   a second pickup element whose sensitivity is high for light with middle wavelength among visible light; and
   a third pickup element whose sensitivity is high for light with short wavelength among visible light,
   the remote control detector is configured to detect the second position of the remote control by using a pixel value taken by the first pickup element and not using a pixel value taken by the second pickup element and the third pickup element.

5. The detector of claim 4, wherein the camera is a Complementary-Metal-Oxide-Semiconductor (CMOS) camera or a Charge-Coupled-Device (CCD) camera.

6. The detector of claim 1 further comprising a code detector configured to detect whether the remote control is for remote-controlling the video display apparatus based on a code of a signal generated by the remote control,
wherein the operator identifier is configured to identify the viewer operating the remote control when the remote control is for remote-controlling the video display apparatus.

7. A video display apparatus comprising:
a detector of claim 1;
a display panel capable of displaying a stereoscopic video; and
a viewing area controller configured to set a viewing area at a position of the detected viewer operating the remote control, the viewing area being an area from which the video displayed on the display panel can be seen stereoscopically.

8. The apparatus of claim 7 further comprising a light receiver configured to receive a signal from the remote control,
wherein the viewing area controller is configured to set the viewing area at the position of the detected viewer operating the remote control at timing when the light receiver receives a viewing area adjustment instruction signal generated by the remote control.

9. A detection method to detect an operator of a remote control for remote-controlling a video display apparatus, the method comprising:
detecting a first position of a viewer's face from a video;
detecting a second position of the remote control from the video; and
identifying a viewer operating the remote control based on the detected first position of the viewer's face and the detected second position of the remote control when a plurality of viewer's faces are detected, wherein
upon identifying the viewer operating the remote control, when the plurality of viewer's faces are detected, a first viewer is identified as the viewer operating the remote control,
a distance in the video between a first horizontal direction position of the first viewer's face and a second horizontal direction position of the remote control being minimum, and
a following equation (2) being satisfied, $$y > Y + f(z) \quad (2)$$

here, y is a first vertical direction position of the first viewer's face in the video, Y is a second vertical direction position of the remote control in the video, f(z) is a value which becomes smaller as a distance z is larger, the distance z is a distance between the video display apparatus and the detected face.

10. The method of claim 9, wherein upon detecting the second position of the remote control, the second position of the remote control is detected based on a difference between the video taken at time t1 and the video taken at time t2 which is after the time t1.

11. The method of claim 9, wherein upon detecting the second position of the remote control, a third position is detected as the second position of the remote control,
difference value between each first pixel of the video at the third position taken at time t1 and each second pixel of the video at the third position taken at time t2 which is after the time t1 being larger than a first value, and
the number of pixels at the third position being equal to or less than a first size.

12. The method of claim 9, wherein the remote control is configured to generate an infrared signal,
upon detecting the second position of the remote control, the second position of the remote control is detected from the video taken by a camera,
the camera comprises:
a first pickup element whose sensitivity is high for light with long wavelength among visible light;
a second pickup element whose sensitivity is high for light with middle wavelength among visible light; and
a third pickup element whose sensitivity is high for light with short wavelength among visible light,
upon detecting the second position of the remote control, the second position of the remote control is detected by using a pixel value taken by the first pickup element and not using a pixel value taken by the second pickup element and the third pickup element.

13. The method of claim 12, wherein the camera is a Complementary-Metal-Oxide-Semiconductor (CMOS) camera or a Charge-Coupled-Device (CCD) camera.

14. The method of claim 9 further comprising detecting whether the remote control is for remote-controlling the video display apparatus based on a code of a signal generated by the remote control,
wherein upon identifying the viewer operating the remote control, the remote control is identified when the remote control is for remote-controlling the video display apparatus.

* * * * *